(12) United States Patent
Matthies

(10) Patent No.: US 7,762,368 B2
(45) Date of Patent: Jul. 27, 2010

(54) TILTING INDEPENDENT SUSPENSION SYSTEM FOR MOTORCYCLE TRIKE

(76) Inventor: Lawayne Matthies, 1888 Mountain Creek Pkwy., Dallas, TX (US) 75211

( * ) Notice: Subject to any disclaimer, the term of this patent is extended or adjusted under 35 U.S.C. 154(b) by 0 days.

(21) Appl. No.: 12/033,999

(22) Filed: Feb. 20, 2008

(65) Prior Publication Data
US 2008/0135320 A1 Jun. 12, 2008

Related U.S. Application Data

(63) Continuation of application No. 11/007,851, filed on Dec. 9, 2004, now Pat. No. 7,343,997.

(60) Provisional application No. 60/528,041, filed on Dec. 9, 2003, provisional application No. 60/539,457, filed on Jan. 27, 2004, provisional application No. 60/558,006, filed on Mar. 31, 2004.

(51) Int. Cl.
*B62D 61/06* (2006.01)

(52) U.S. Cl. ..................................... 180/210

(58) Field of Classification Search ............... 180/215, 180/210, 211; 280/124.103, 124.104
See application file for complete search history.

(56) References Cited

U.S. PATENT DOCUMENTS

| | | | | |
|---|---|---|---|---|
| 3,792,748 A | * | 2/1974 | Regier | 180/41 |
| 4,003,443 A | * | 1/1977 | Boughers | 180/217 |
| 4,351,410 A | * | 9/1982 | Townsend | 180/210 |
| 4,546,997 A | * | 10/1985 | Smyers | 280/5.509 |
| 4,887,829 A | * | 12/1989 | Prince | 280/282 |
| 4,974,863 A | * | 12/1990 | Patin | 280/62 |
| 5,040,812 A | * | 8/1991 | Patin | 280/62 |
| 5,116,069 A | | 5/1992 | Miller | |
| 5,611,555 A | * | 3/1997 | Vidal | 280/282 |

(Continued)

FOREIGN PATENT DOCUMENTS

JP 02182528 7/1990

(Continued)

OTHER PUBLICATIONS

Popular Science, Sep. 2004, p. 117, 1998 Chrysler CCV.

(Continued)

*Primary Examiner*—Faye M. Fleming
(74) *Attorney, Agent, or Firm*—James E. Walton

(57) ABSTRACT

A tilting suspension system is adapted for use with a vehicle having three wheels and a frame. The system has two sets of control arms, each set of control arms being pivotally connected to one side of the frame. An upright is pivotally connected to each set of control arms, each upright having a rotatable hub for allowing one of the wheels to be mounted thereto. Two rocker arms are pivotally connected to the frame, and a control link is pivotally connected to each of the rocker arms, such that pivoting of one rocker arm causes corresponding pivoting of the other rocker arm. A link member operably connects each rocker arm to a corresponding upright, such that pivoting of each rocker arm causes corresponding movement of the uprights. An actuator is configured to selectively pivot the rocker arms, such that actuation of the actuator pivots the rocker arms, thereby causing the frame to rotate about a generally longitudinal roll center and causing each upright to rotate about a generally longitudinal axis.

8 Claims, 16 Drawing Sheets

U.S. PATENT DOCUMENTS 5,765,846 A * 6/1998 Braun ................ 280/124.103
6,328,125 B1 12/2001 Van Der Brink et al.
2007/0075517 A1 * 4/2007 Suhre et al. ........... 280/124.134

FOREIGN PATENT DOCUMENTS

JP 02182528 A * 7/1990

OTHER PUBLICATIONS

Automotive Engineering, Nov. 1997, p. 61, Tech Briefs.
Motorcycle Product News, Nov. 1997, p. 44, Three's Company.
Dealernews, Oct. 1997, p. 14, News from Europe.
Popular Science, Nov. 1989, p. 63, Automotive Newsfront.
Bike Europe, Unknown issue, p. 17, Nothing New About Motorcycles & Scooters with Roofs.
Unknown publication, Unknown issue, Lehman Trikes, Inc., No Lean Suspension (advertisement).

* cited by examiner

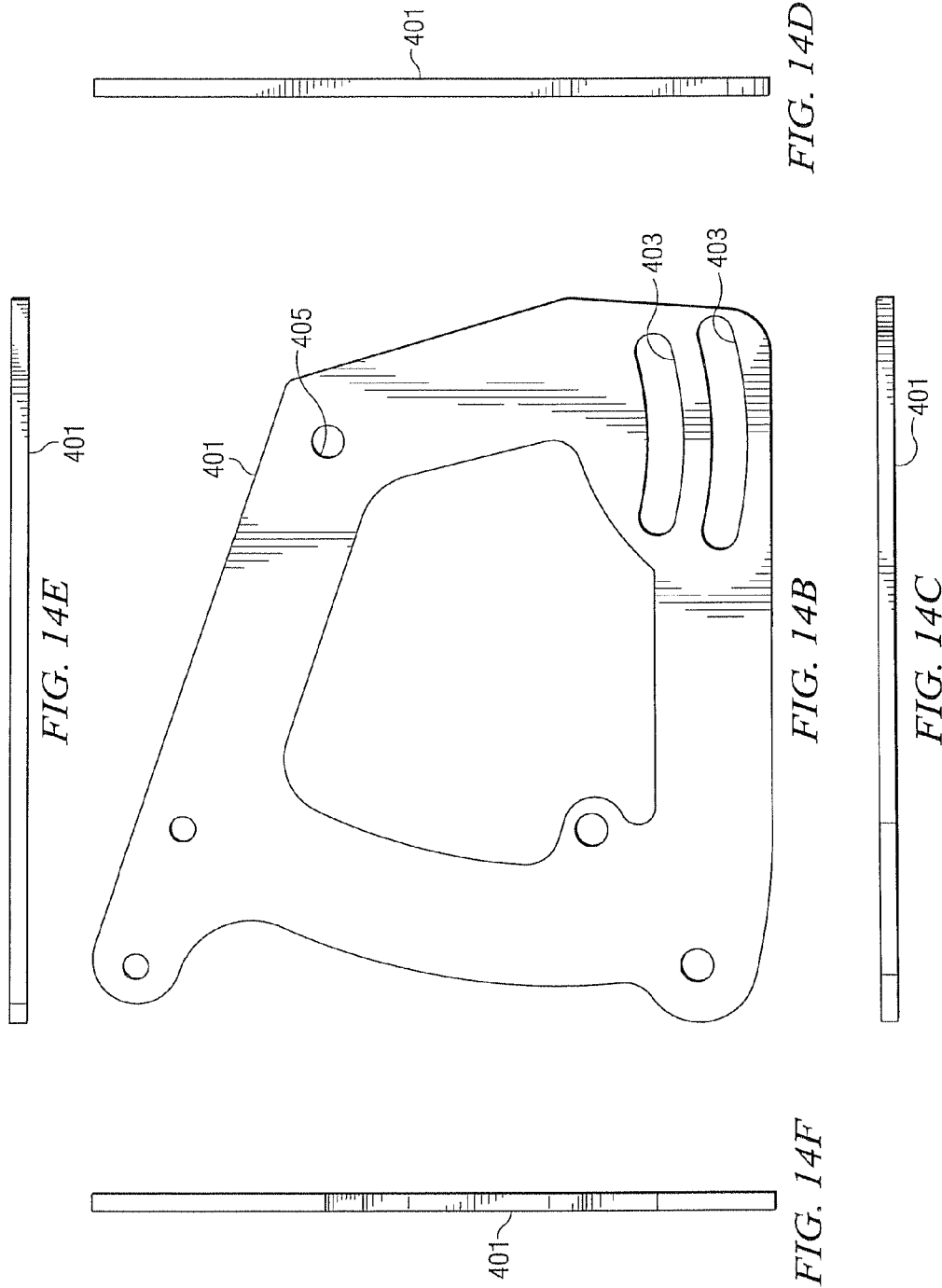

TILTING INDEPENDENT SUSPENSION SYSTEM FOR MOTORCYCLE TRIKE

This application is a continuation of U.S. application Ser. No. 11/007,851, filed on 9 Dec. 2004, now U.S. Pat. No. 7,343,997 titled "Tilting Independent Suspension System for Motorcycle Trike," which claimed the benefit of U.S. Provisional Application No. 60/528,041, filed 9 Dec. 2003, and titled "Tilting Independent Suspension System for Motorcycle Trike," and which claimed the benefit of U.S. Provisional Application No. 60/539,457, filed 27 Jan. 2004, titled "Tilting Independent Suspension System for Motorcycle Trike," and which claimed the benefit of U.S. Provisional Application No. 60/558,006, filed 31 Mar. 2004, titled "Tilting Independent Suspension System for Motorcycle Trike."

BACKGROUND OF THE INVENTION

1. Field of the Invention

The present invention relates to motorcycle trikes. In particular, the present invention relates to suspension systems for motorcycle trikes.

2. Description of Related Art

Motorcycles are turned by both turning the handlebars and leaning into the turn. At high speeds, motorcycles can be turned simply by leaning into the turn. The ability to lean into the turn makes the motorcycle easier to handle in the turns.

However, when motorcycles are converted into three-wheeled trikes, this ability to lean into the turn is lost. This makes it difficult to handle the trike when turning, particularly at high speeds.

SUMMARY OF THE INVENTION

There is a need for a tilting independent suspension system for a motorcycle trike.

Therefore, it is an object of the present invention to provide a tilting independent suspension system for a motorcycle trike.

This object is achieved by providing a suspension system that automatically tilts the frame of the trike when the trike turns. The tilting suspension system has sensors that sense the orientation, speed, and/or acceleration of the trike. The sensors send signals to a control system that is connected to a connecting rod disposed between two opposing rotating rocker arms. The rotating rocker arms are pivotally connected to the upper portions of the towers of the rear suspension system. The shock absorbers of the rear suspension system are pivotally mounted between the lower H-arms and exterior leg portions of the rotating rocker arms. When the sensors sense that the trike is in a turn, the control system causes the connecting rod to rotate the rotating rocker arms, thereby tilting the frame.

The tilting independent suspension system of the present invention may also be implemented manually by using one or more manual controls to activate the tilting mechanisms, and these controls may be located on the handlebars or other location on the trike.

The tilting independent suspension according to the present invention provides a number of significant advantages, including: (1) the trike is safer; (2) the trike is easier to handle; and (3) the trike automatically tilts into turns.

BRIEF DESCRIPTION OF THE DRAWINGS

The novel features believed to be characteristic of the invention are set forth in the appended claims. However, the invention itself, as well as a preferred mode of use and further objectives and advantages thereof, will best be understood by reference to the following detailed description when read in conjunction with the accompanying drawings, wherein:

DETAILED DESCRIPTION OF THE PREFERRED EMBODIMENT

Figure 1:
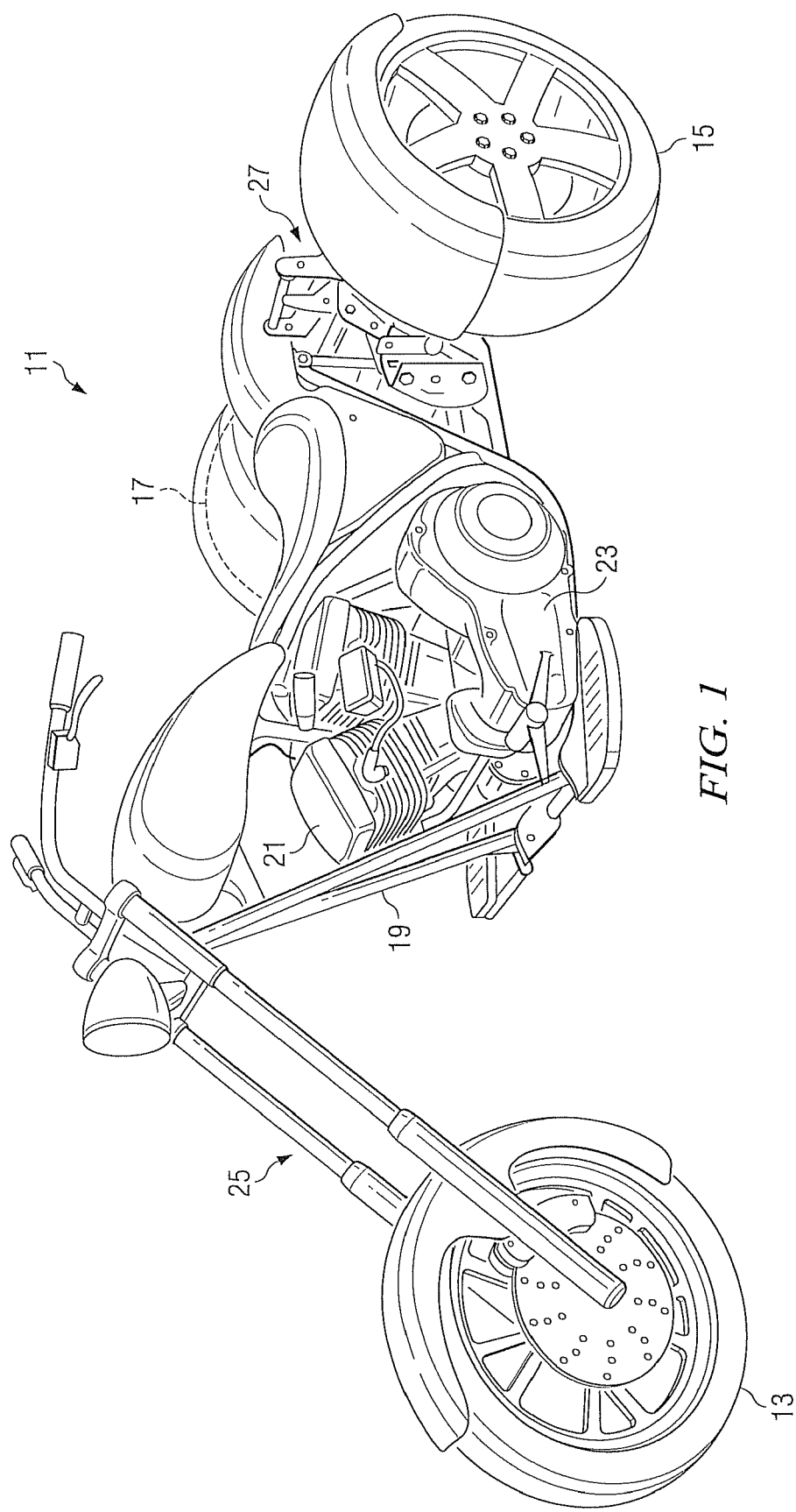
FIG. 1 is a perspective view of a motorcycle trike having a tilting independent suspension system according to the present invention.

Referring to FIG. 1 in the drawings, a motorcycle trike, or trike 11, having a tilting independent suspension system according to the present invention is illustrated. Trike 11 is three-wheeled motorcycle having a single front wheel 13, and two rear wheels 15 and 17. A frame 19 carries an engine 21 and a transmission 23. Front wheel 13 is coupled to frame 19 via a front fork and suspension system 25. Rear wheels 15 and 17 are coupled to frame 19 via a tilting independent suspension system 27.

Figure 2:
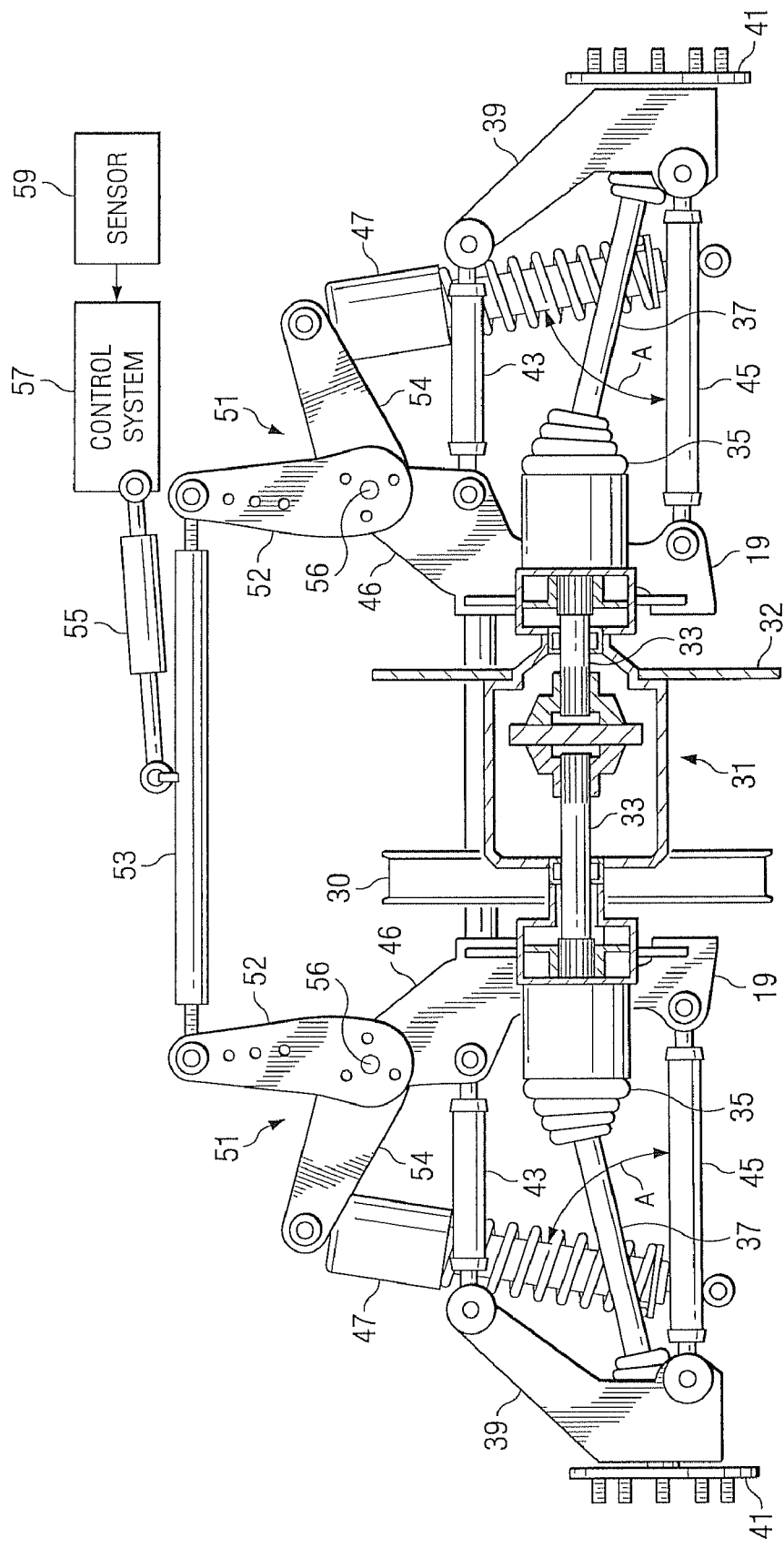
FIG. 2 is a schematic of the suspension system according to the present invention, the suspension system being shown in a non-tilting mode.
Figure 3:
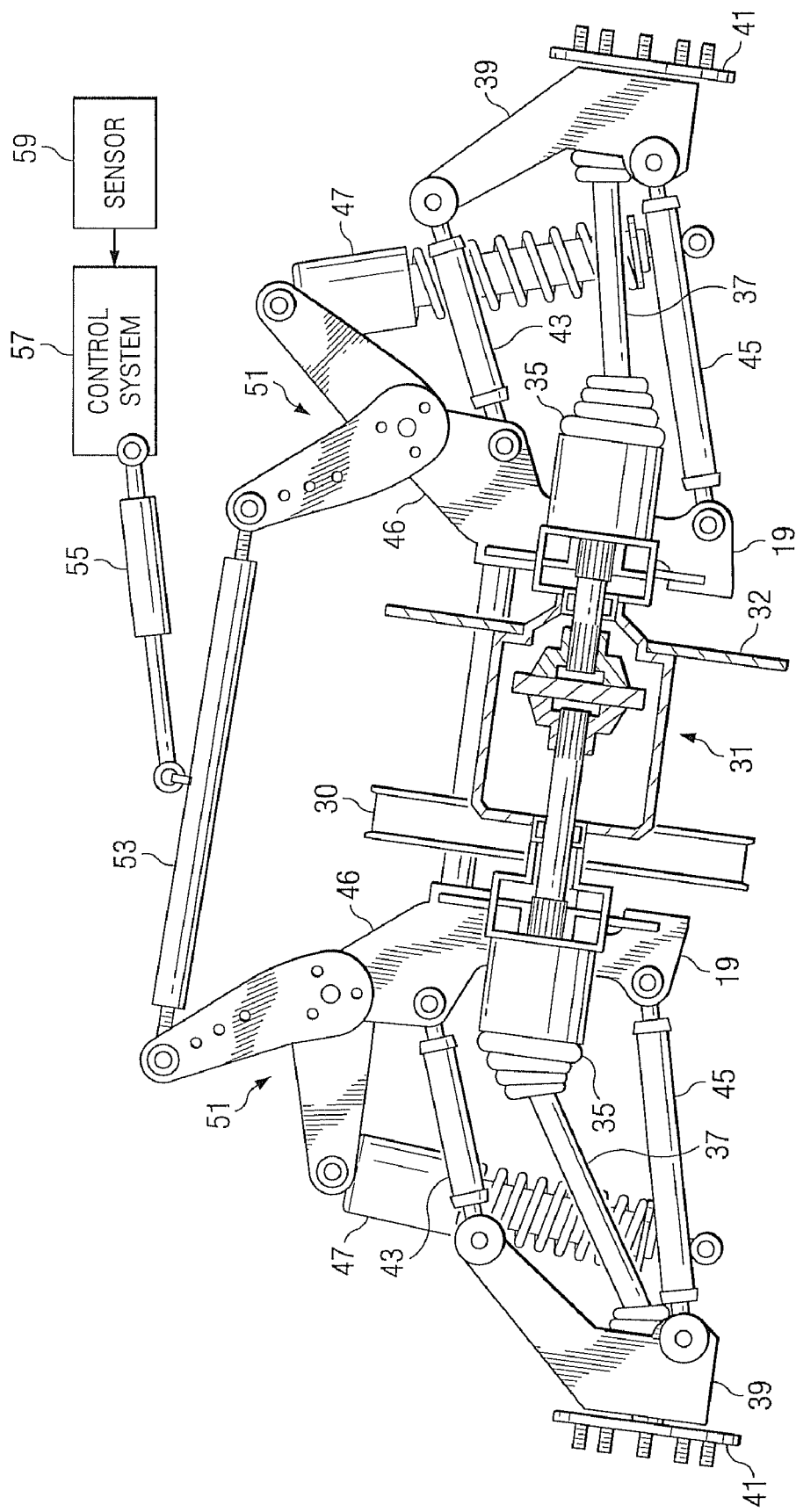
FIG. 3 is a schematic of the suspension system of FIG. 2 shown in a tilting mode.

Referring now to FIGS. 2 and 3 in the drawings, tilting independent suspension system 27 is illustrated. Suspension system 27 is preferably a double control-arm suspension and is operable between a non-tilting mode, as is shown in FIG. 2, and a tilting mode, as is shown in FIG. 3. Trike 11 operates in the non-tilting mode when traveling in a straight direction, but transitions into the tilting mode when turning. This provides for better, safer, and more enjoyable handling of trike 11.

Transmission 23 includes a belt drive or drive shaft unit 30, a differential 31, at least one disk brake 32, axles 33, universal joints 35, half shaft drive links 37, wheel uprights 39, and wheel hubs 41. Wheels 15 and 17 are fastened to wheel hubs 41. Uprights 39 are connected to frame 19 via upper and lower controls arms, shown in the figures as upper H-arms 43 and lower H-arms 45, which cooperate to allow each upright 39 to move in a generally vertical path relative to frame 19 as H-arms 43, 45 pivot relative to frame 19. Frame 19 includes towers 46 that extend generally upward from each side of frame 19. The movement of each upright 39 is constrained and damped by a shock absorber 47, which may be an air shock absorber or any other appropriate type of suspension damper.

The unique tilting feature of the subject invention is facilitated by two opposing rotating rocker arms 51. In the preferred embodiment, each rotating rocker arm 51 is V-shaped, having an interior leg 52 and an exterior leg 54, such that interior legs 52 and exterior legs 54 meet at vertices 56 and rotate relative to frame 19 about pivot pins 58. It will be appreciated that rotating rocker arms 51 may be of different shapes, sizes, and configurations. Rotating rocker arms 51 are pivotally connected to towers 46 at vertices 56. The upper ends of shock absorbers 47 are pivotally coupled to exterior legs 54, and the lower ends of shock absorbers 47 are pivotally coupled to lower H-arms 45. Shock absorbers 47 and lower H-arms 45 form tilt angles A. The two rotating rocker arms 51 are rigidly and pivotally linked together by an adjustable connecting rod 53 that extends between interior legs 52.

Connecting rod 53 is selectively driven in opposing directions by a control actuator 55. Control actuator 55 may be a pneumatic, hydraulic, electric, or magnetic device, and actuator 55 is controlled by a control system 57. Actuator 55 may be a ball-screw device or other similar electro-mechanical device. Control system 57 is activated by one or more sensors 59 operably associated suspension system 27. Sensors 59 preferably sense the orientation, speed, and/or acceleration of trike 11, and may be pneumatic, hydraulic, electric, or magnetic devices, or any other suitable sensing apparatus.

In the preferred embodiment, suspension system 27 allows free movement of uprights 39 until a selected tilt angle A is reached. When the selected tilt angle A is reached, such as during a turn, control system 57 is activated by sensor 59. Control system 57 then actuates actuator 55, thereby causing movement of connecting rod 53 and corresponding rotational movement of rotating rocker arms 51 about pivot pins 58. The rotational movement of rotating rocker arms 51 causes frame 19 to tilt in the direction of the turn, thereby improving the handling of trike 11. It will be appreciated that a full lean is not necessary. One purpose of suspension system 27 is to "break" the steering so that front fork and suspension system 25 "falls" into the turn more easily.

Figure 4:
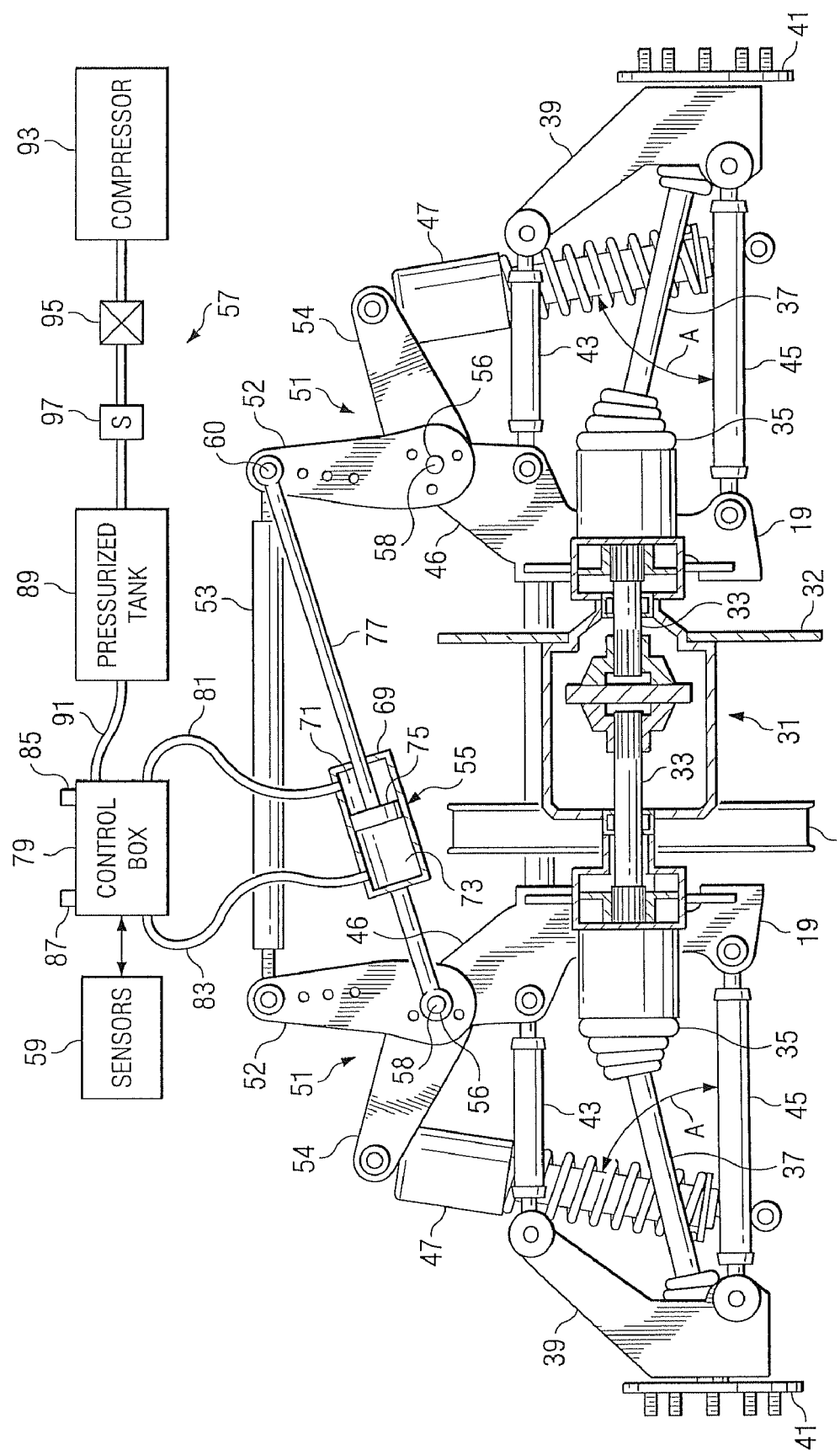
FIG. 4 is a schematic of an alternative embodiment of a tilting independent suspension system for a motorcycle trike according to the present invention.

Referring now to FIG. 4 in the drawings, an alternate embodiment of trike 11 is illustrated. In this embodiment, control actuator 55 is disposed between one of towers 46 and one of rocker arms 51. In this embodiment, it is preferred that one end of control actuator 55 be pivotally mounted to tower 46 at a pivot pin 58, and the other end of control actuator 55 be pivotally mounted to rocker arm 51 at a second pivot pin 60. As shown in the FIG. 4, control actuator 55 includes a housing 69 that defines two opposing fluid chambers 71 and 73 that are separated by a piston 75. Piston 75 is connected to an elongated shaft 77. Housing 69 is pivotally connected to pivot pin 58, and elongated shaft 77 is pivotally connected to pivot pin 60. Fluid chambers 71 and 73 are in fluid communication with a control box 79 via conduits 81 and 83. Though shown in the figure as a pneumatic or hydraulic type, actuator 55 may be of any appropriate type, as described above.

Control box 79 includes vent ports 85 and 87 that are operably associated with fluid chambers 71 and 73, respectively. It will be appreciated that in applications in which the control fluid is air, vent ports 85 and 87 may be open to the environment; and that in applications in which the control fluid is a hydraulic fluid, vent ports 85 and 87 would be in fluid communication with a fluid reservoir. Control box 79 is in fluid communication with a source of pressurized fluid, such as pressurized tank 89, via a conduit 91. Pressurized tank 89 supplies pressurized fluid to control box 79 for controlling control actuator 55. It is preferred that the fluid in control system 57 be air, and that tank 89 be maintained at about 80 psi. However, it should be understood that a wide variety of control fluids may be used over a wide range of pressures, depending upon the desired application, responsiveness, and cost.

Tank 89 is in fluid communication with and pressurized by a compressor 93. A one-way check valve 95 and a pressure switch 97 may be disposed between compressor 95 and tank 89. One-way check valve 95 ensures that the fluid does not pass back through to compressor when compressor is in the off mode. Pressure switch 97 turns off compressor 95 when tank 89 has reached the desired pressure, and prevents compressor 95 from over-pressurizing control system 57.

In operation, when trike 11 is traveling straight, control actuator 55 is in a trim condition in which the pressures in chambers 71 and 73 are equalized. When trike 11 goes into a turn, sensors 59 send a signal to control box 79. Control box 79 then selectively increases the pressure in one of chambers 73 or 75, and correspondingly decreases the pressure in the other chamber. Vent ports 85 and 87 allow the fluid from the depressurized chamber to be appropriately vented. As a result, piston 75 moves in one direction or the other. Because housing 69 is pivotally mounted to tower 46, movement of piston 75 causes a corresponding rotation of rocker arms 51. The rotational movement of rotating rocker arms 51 causes frame 19 to tilt in the direction of the turn, thereby improving the handling of trike 11. Control system 57 will maintain trike 11 in the tilted mode as long as sensors 59 sense that trike 11 is in the turn. As trike 11 leaves the turn and returns to straight travel, control box 79 causes the pressure in chambers 71 and 73 to again equalize and return control actuator 55 to the trim condition.

It will be appreciated that control system 57 is preferably programmed or adjusted to provide a safe and smooth transition between tilting and straightening out. It should be understood that control system 57 may be operated manually or may be automated by computers, microprocessors, or any of a wide variety of automated control devices. For example, sensors 59 may be manual switches (not shown) disposed on the handlebars of trike 11 that are operated by the rider, or control system 57 may be configured to operate automatically without any input from the rider. In addition, it will be appreciated that trike 11 may include a means for manual or automatic override of control system 57.

Figure 5:
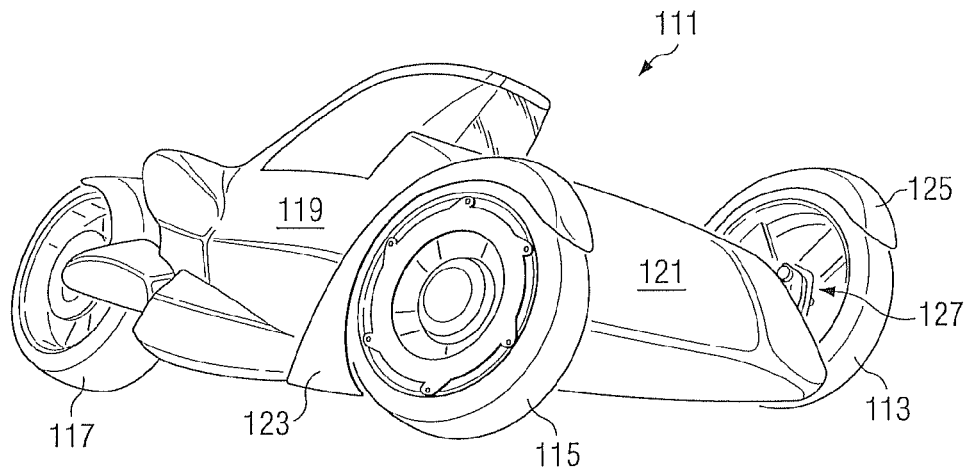
FIG. 5 is a perspective view of a motorcycle trike having a tilting independent suspension system according to the present invention in which the trike has two front wheels and one rear wheel.

Referring now to FIG. 5 in the drawings, an alternate embodiment of the present invention is illustrated. In this embodiment, a trike 111 has two front wheels 113, 115 and one rear wheel 117. In this embodiment, a suspension system 127, which is similar in form and function to suspension system 27, is operably associated with the front wheels instead of the rear wheels. Suspension system 127 allows front wheels 113, 115 to tilt when trike 111 turns, making trike 111 easier to handle.

As is shown, trike 111 may include a body portion 119 that covers or encloses all or part of suspension system 127. In those embodiments in which body portion 119 includes a main body 121 and separate fenders 123, 125, it will be understood that suspension system 127 may be appropriately scaled down in size and shape, or relocated on trike 111 to fit within the confines of main body 121 and/or fenders 123, 125. For example, the rotating rocker arms, the adjustable connecting rod, the control actuator, and the other components of suspension system 127 may be located beneath or in the same plane as the differential. One benefit of the present invention is that the components can be located in a wide variety of locations on the trike without adversely affecting the operation of the suspension system.

Figure 6:
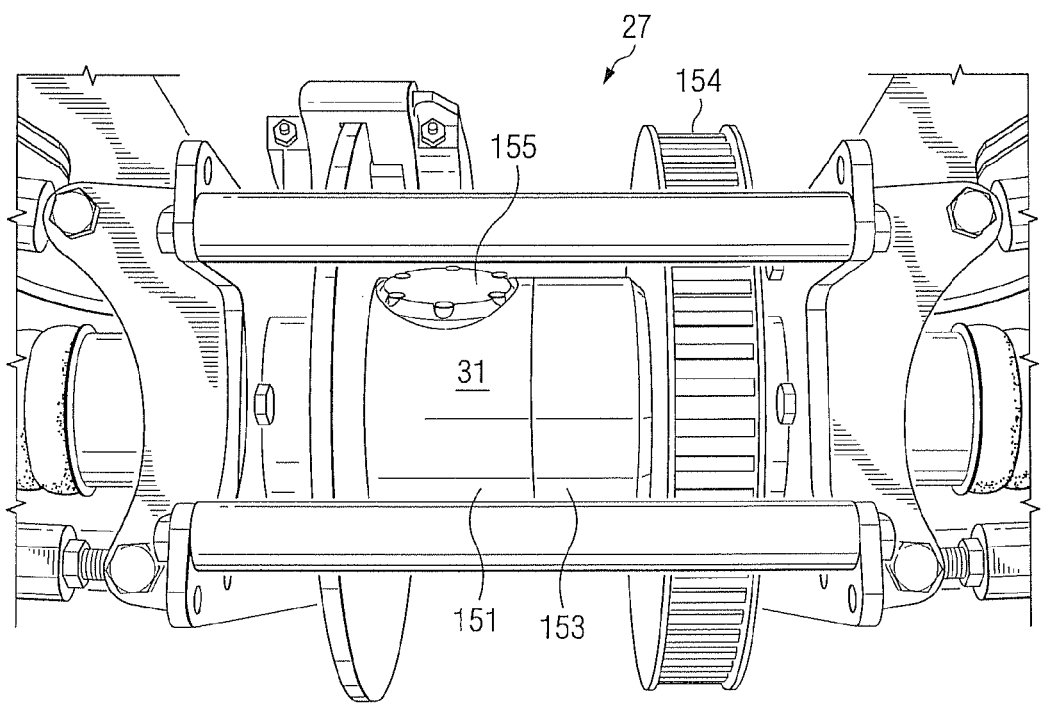
FIG. 6 is a perspective view of a differential according to the present invention for the tilting independent suspension system of the invention.
Figure 7:
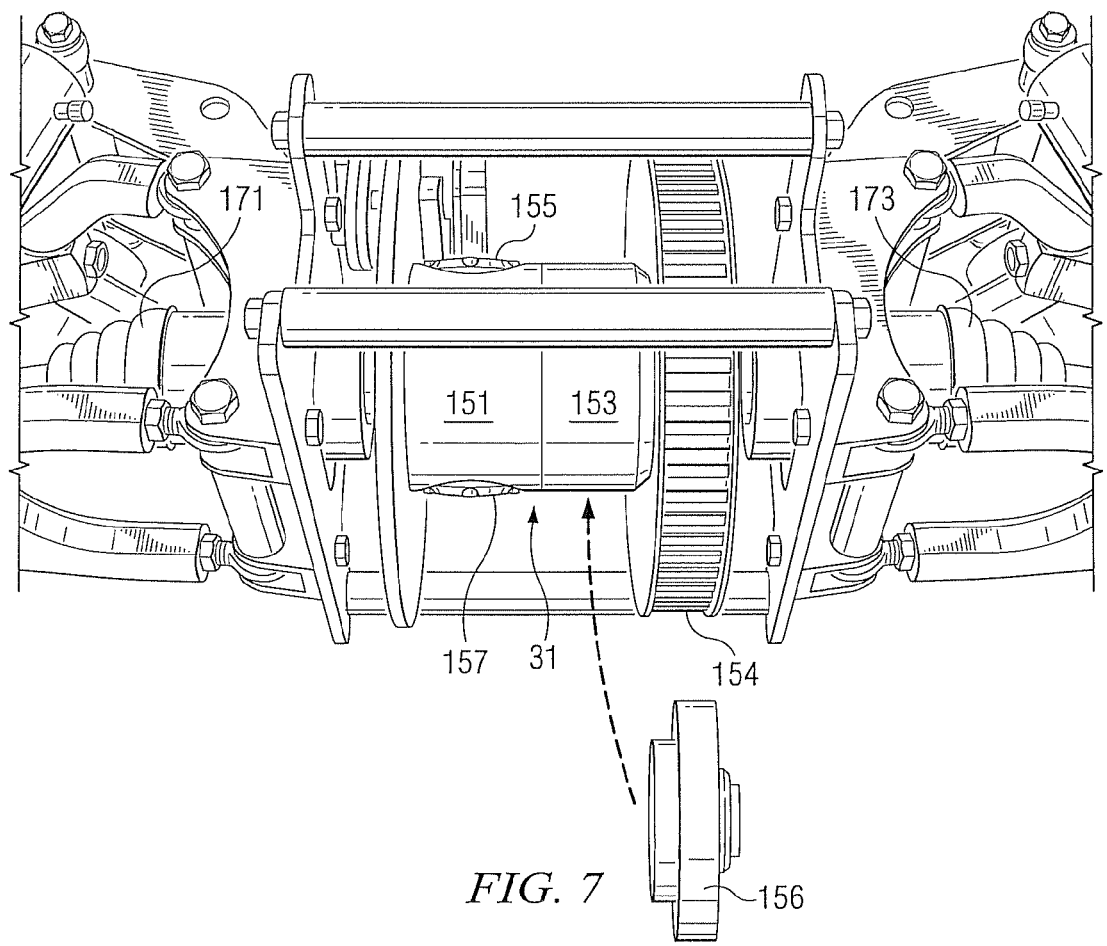
FIG. 7 is another perspective view of the differential of FIG. 6 showing an alternate reduced size cover plate.
Figure 8:
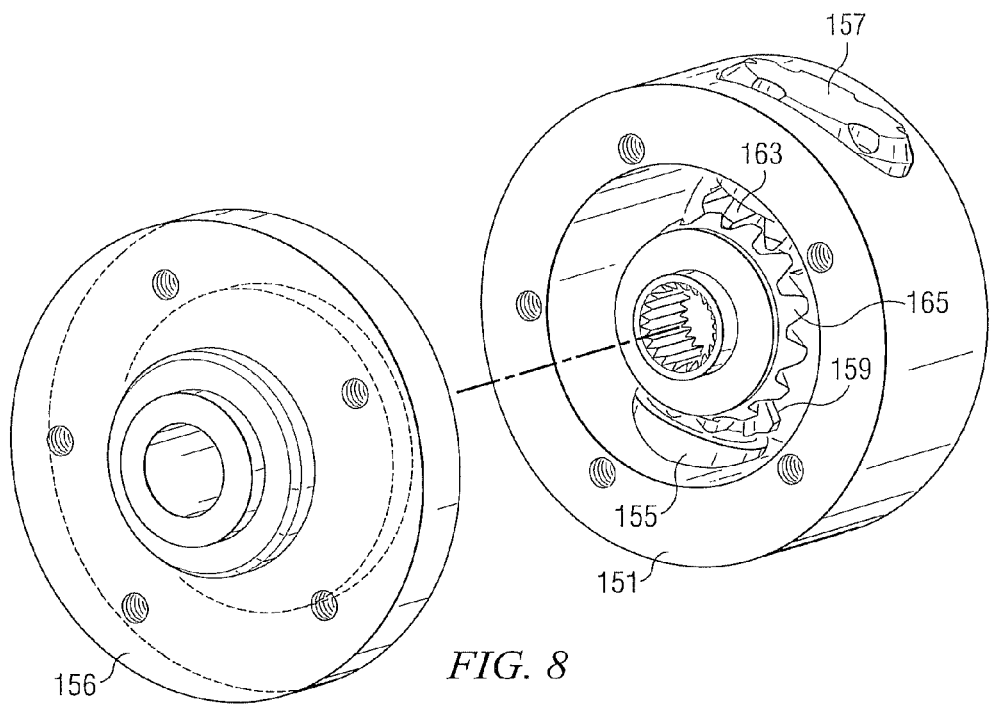
FIG. 8 is a perspective view of the differential of FIG. 6 shown with the cover plate removed.
Figure 9:
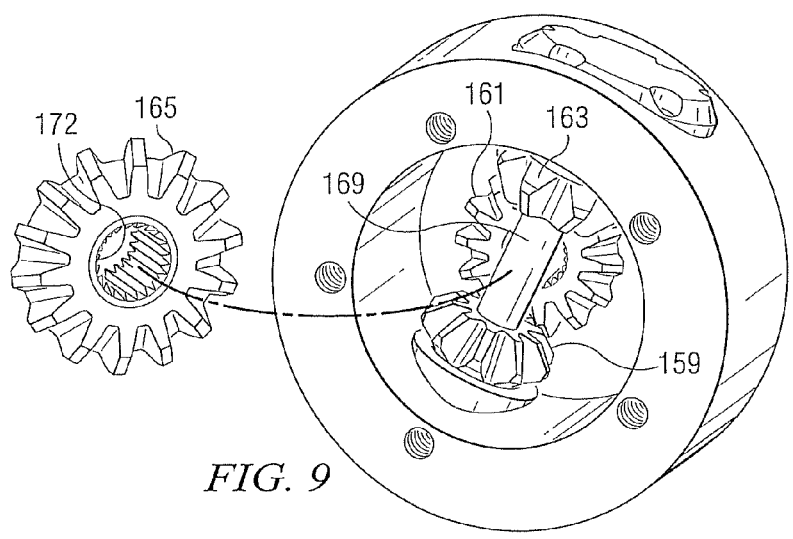
FIG. 9 is a perspective view of the differential of FIG. 6 shown with the cover plate and one of the bevel gears removed.
Figure 10:
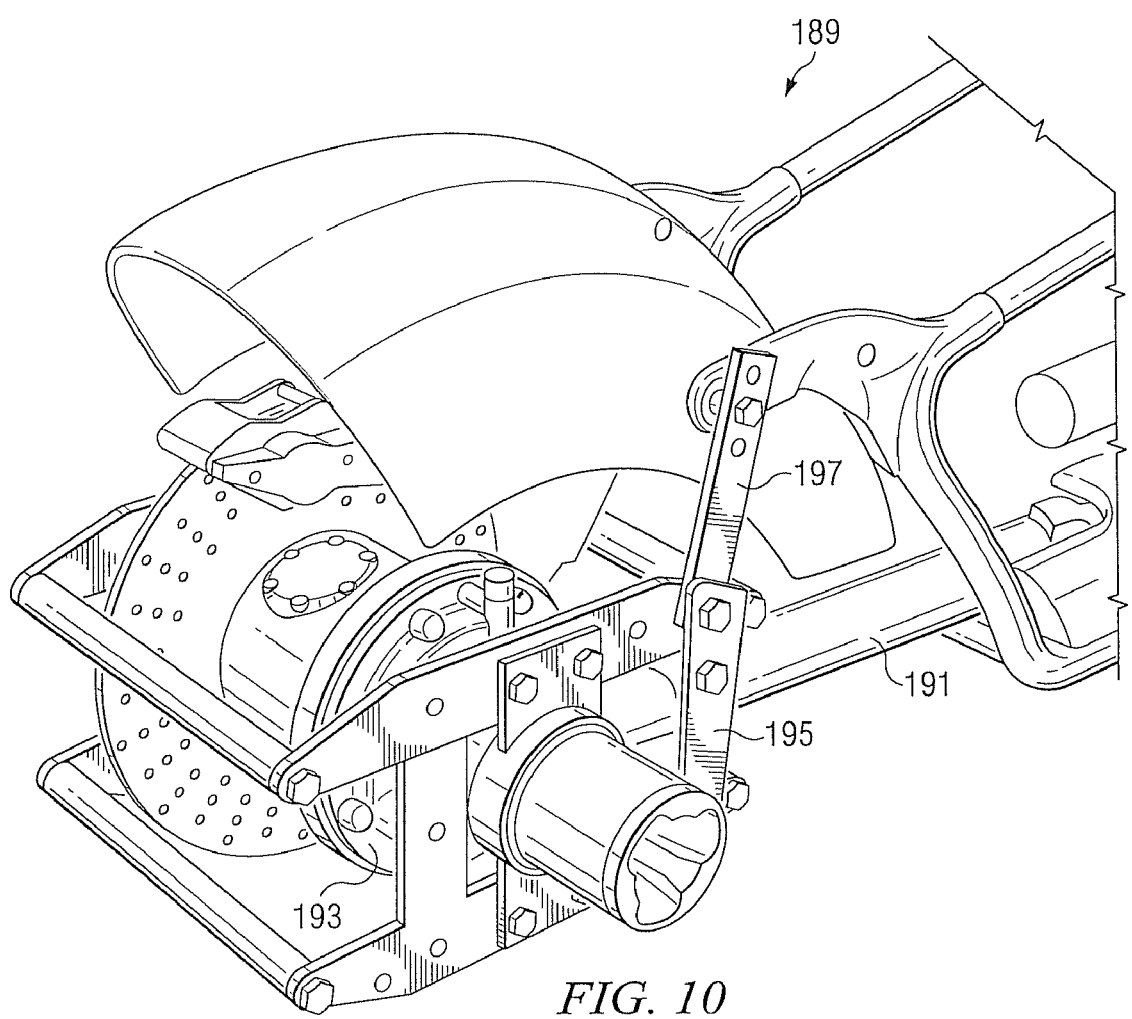
FIG. 10 is a perspective view of the differential of FIG. 6 shown installed on a motorcycle having a shaft-drive transmission.
Figure 11A:
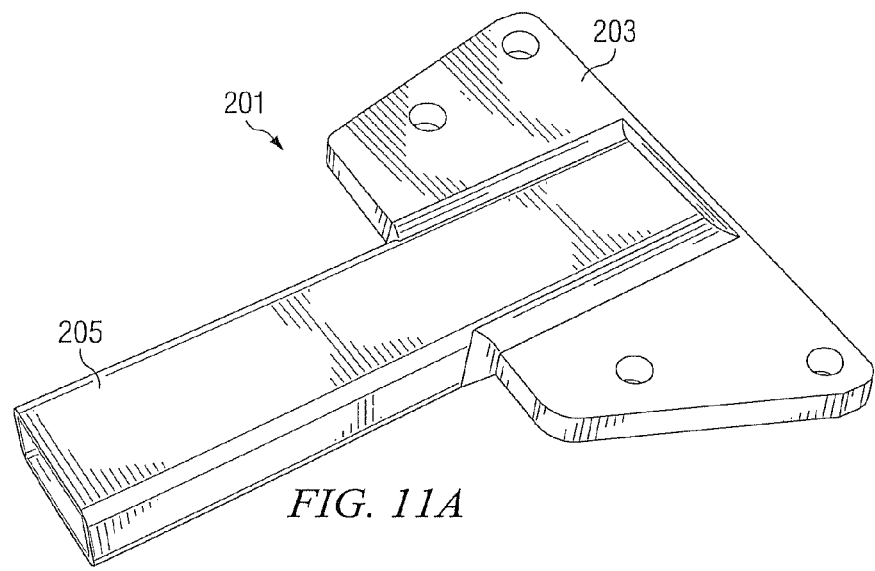
FIGS. 11A-14F are various views of several different adapter brackets used with the present invention.
Figure 11B:
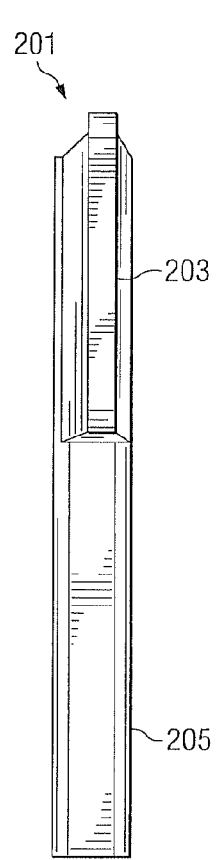
Figure 11C:
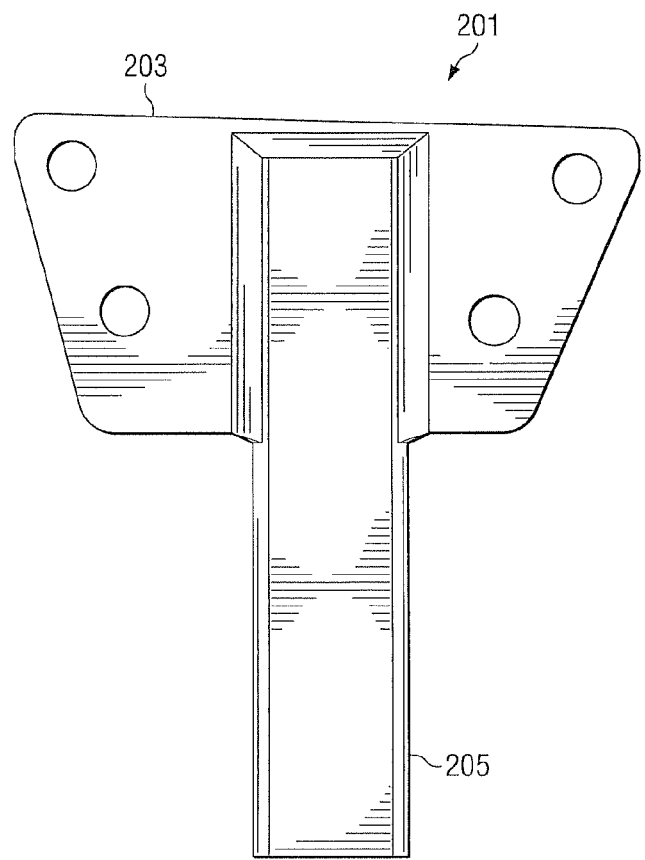
Figure 11D:
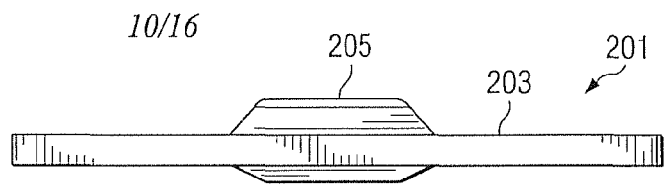
Figure 11E:
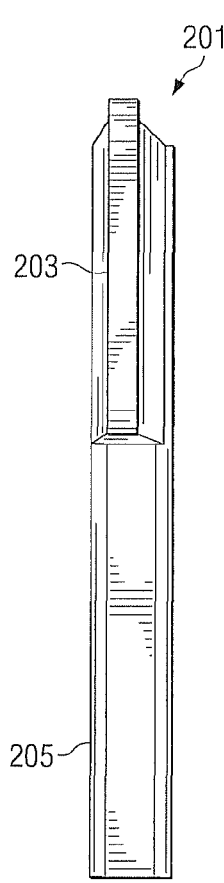
Figure 11F:
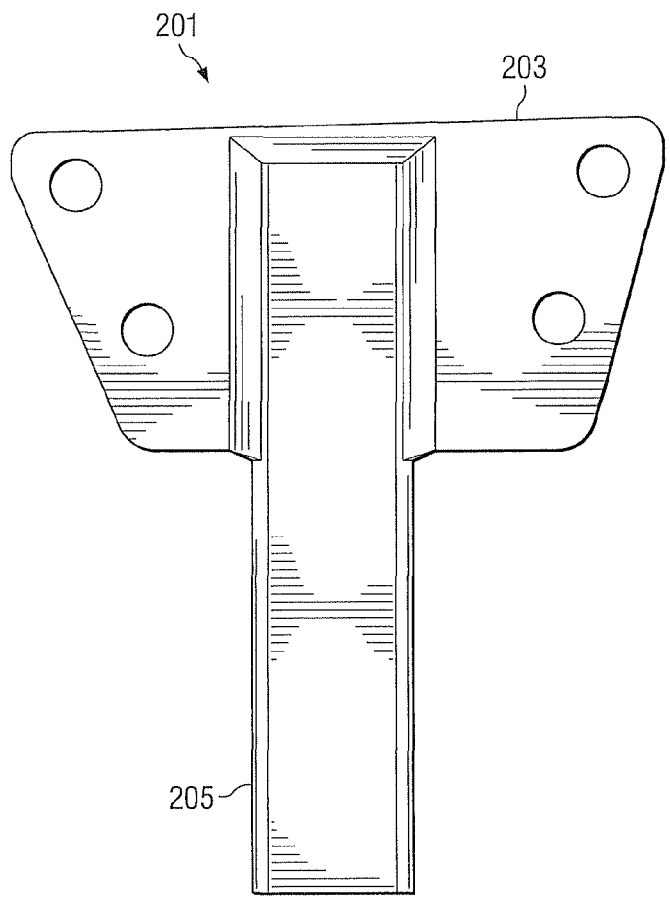
Figure 11G:
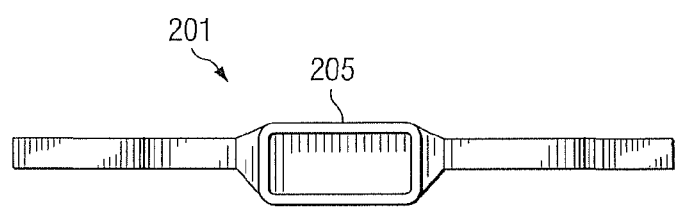
Figure 12A:
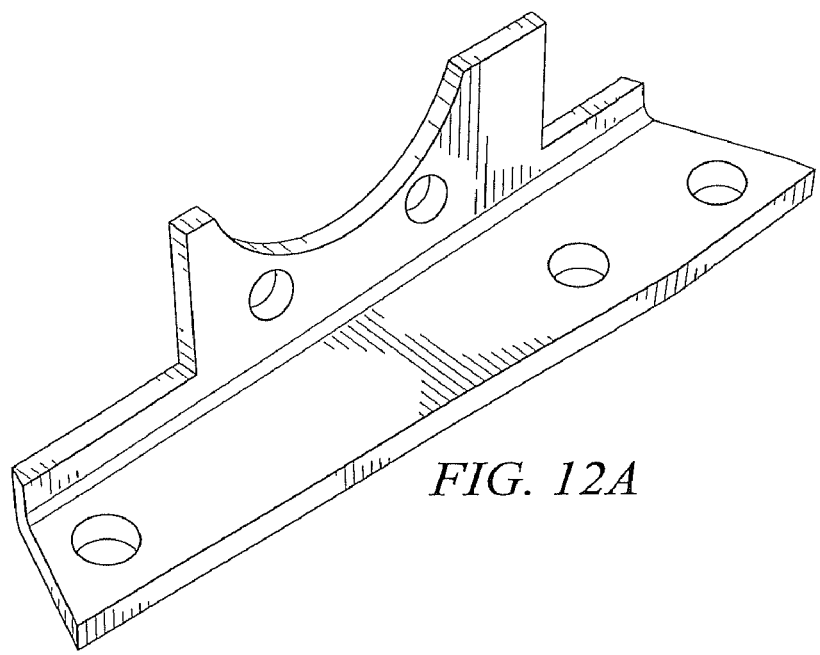
Figure 12B:
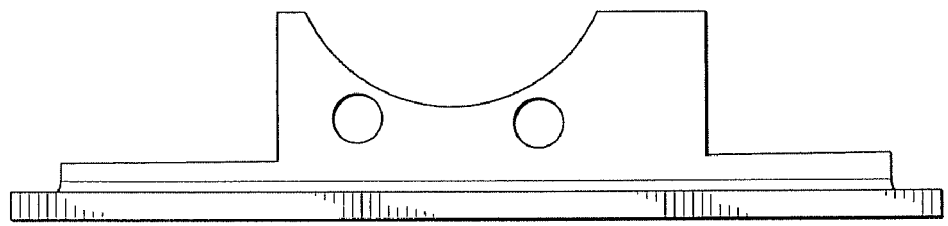
Figure 12C:
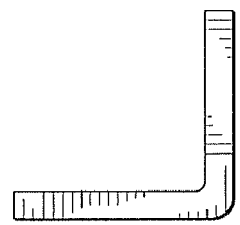
Figure 12D:
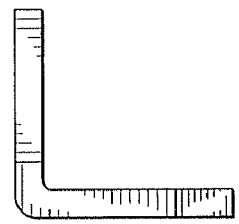
Figure 12E:
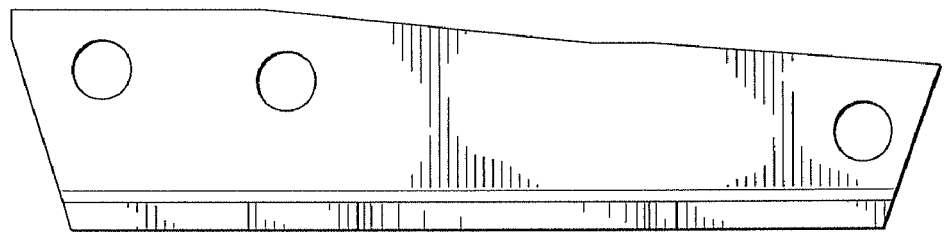
Figure 12F:
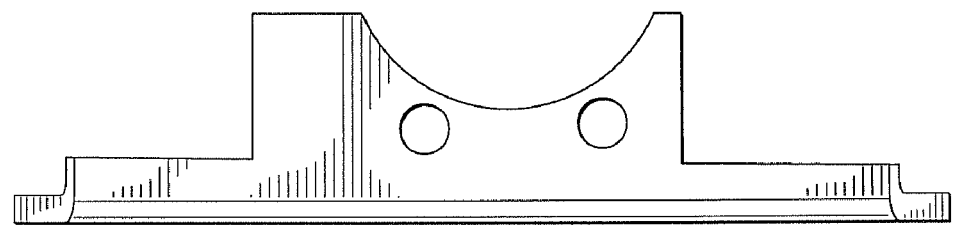
Figure 12G:
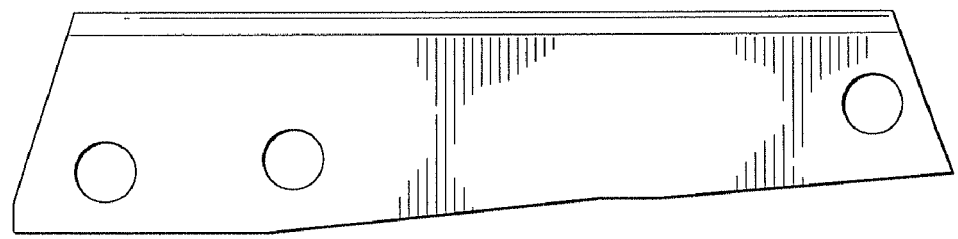
Figure 13A:
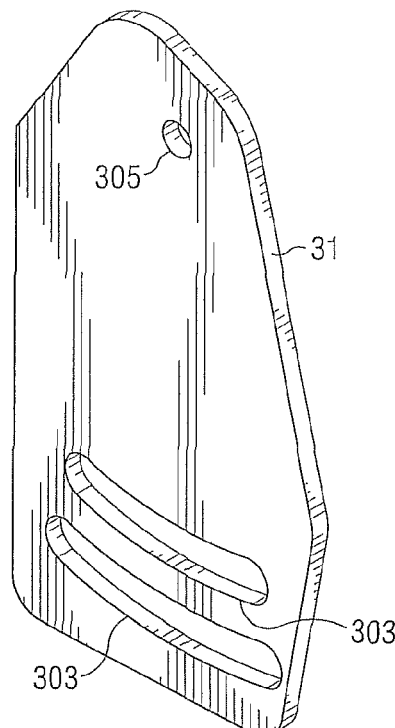
Figure 13B:
Figure 13C:
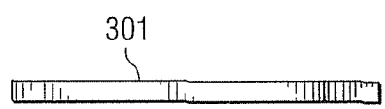
Figures 13D, 13E, 13F:
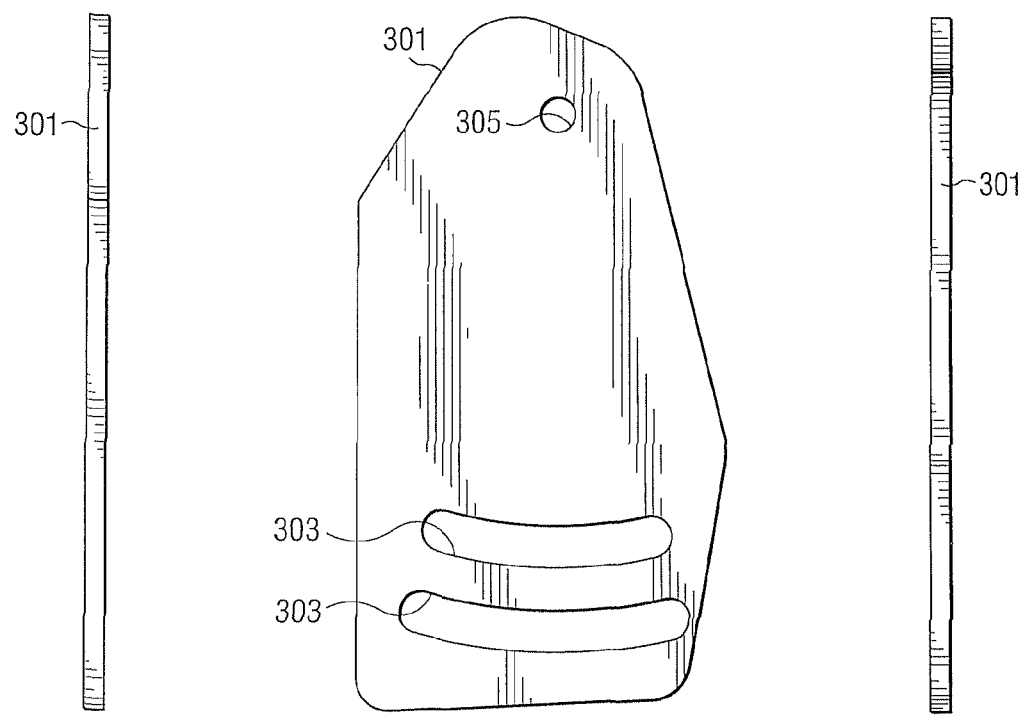
Figure 14A:
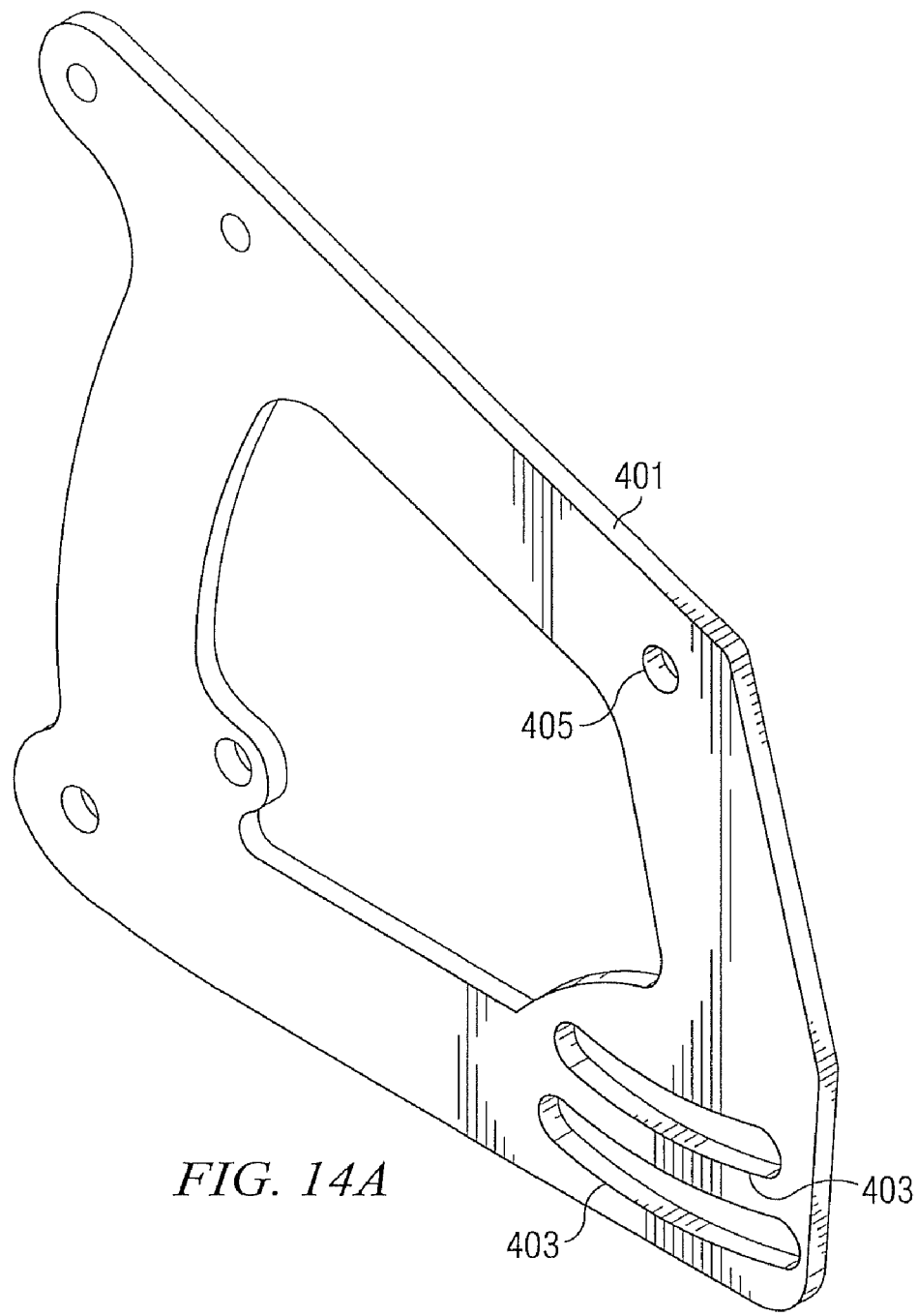

Referring now to FIGS. 6-10 in the drawings, differential 31 is shown in various views. In FIG. 6, differential 31 is shown installed in suspension system 27. Differential 31 is fixed to and rotates with a drive pulley 154 for transmitting torque to the wheels of the trike. Differential 31 includes a base portion 151 and a cap portion 153 that encloses differential 31. Base portion 151 includes two inserts 155, 157 that allow access to the interior of differential 31 for assembly and maintenance, and that provide internal operating surfaces for a pair of opposing bevel gears 159, 163. Cap portion 153 also functions as a spacing means that allows differential 31 to be used to convert both shaft-drive and belt-drive motorcycles to trikes. In FIGS. 6 and 7, differential 31 is shown installed on a belt-drive trike. In FIG. 10, cap portion 153 of differential 31 has been replaced with an alternate, reduced size cap portion 156. Cap portion 156 allows differential 31 to be used installed on a shaft-drive trike. Cap portions 153 and 156 are shown side-by-side in FIG. 7 for comparative purposes.

Differential 31 includes a plurality of internal bevel gears 159, 161, 163, 165 that allow the two wheels of the trike, whether located on the front or on the rear, to rotate at different speeds as the trike travels through turns. Gears 159 and 163 oppose each other and rotate on concave support surfaces located on the interior surfaces of inserts 155, 157. Gears 159 and 163 are supported by a fixed shaft 169. Gears 161 and 165 oppose each other and are coupled together via gears 159 and 163. Gears 161 and 165 include internal splines 172 that are configured to matingly receive splined drive shafts (not shown) that extend outward from each side of differential 31 to continuously variable universal joints 171, 173. Gears 159, 161, 163, 165 rotate with base portion 151 and cap portion 153 and do no rotate relative to each other unless the trike is turning.

In FIG. 10, differential 31 is installed on a trike 189 having a shaft-drive transmission. Torque is transmitted to differential 31 from a drive shaft 191 through a 90° coupling member 193. Thinner cap portion 156 is best suited for this embodiment, due to the thickness of coupling member 193. In this embodiment, the splined shaft on the side of coupling member 193 is longer so that it can pass through coupling member 193 to the continuously variable universal joint on that side. In these shaft-drive embodiments, the suspension system is mounted to the motorcycle with an adapter bracket 195, a mounting link 197, and a second hatchet-shaped adapter bracket (see FIGS. 11A-11G).

Referring now to FIGS. 11A-14G in the drawings, several different adapter brackets that are used to mount the suspension system to the motorcycle frame are illustrated. The adapter brackets shown in FIGS. 11A-12G are typically used to convert shaft-drive motorcycles to trikes. In FIGS. 11A-11G, an adapter bracket 201 for converting a shaft-drive motorcycle to a trike is shown. Adapter bracket 201 includes a coupling end 203 and a shaft end 205 that is configured to be coupled to and/or telescopically mate with the frame of the motorcycle. Adapter bracket 195 is shown in FIGS. 12A-12G.

The adapter brackets shown in FIGS. 13A-14F are typically used to convert belt-drive motorcycles to trikes. Adapter bracket 301 shown in FIGS. 13A-13 includes one or more arcuate slots 303 that allow the suspension system to rotate about a pivot point 305. This allows the belt to be placed over the belt drive pulley and adjusted. Likewise, adapter bracket 401 shown in FIGS. 14A-14F includes one or more arcuate slots 403 that allow the suspension system to rotate about a pivot point 405. The dashed lines indicate that the shape of that portion of bracket 401 may vary.

In another embodiment of the present invention, the belt drive pulley includes a central, hollowed-out can-shaped portion. This can shaped portion allows the differential and bearings to be completely or partially recessed therein. This configuration allows longer drive shafts to be used, which in turn, allows the suspension system to have a greater range of tilting angles.

Figure 15:
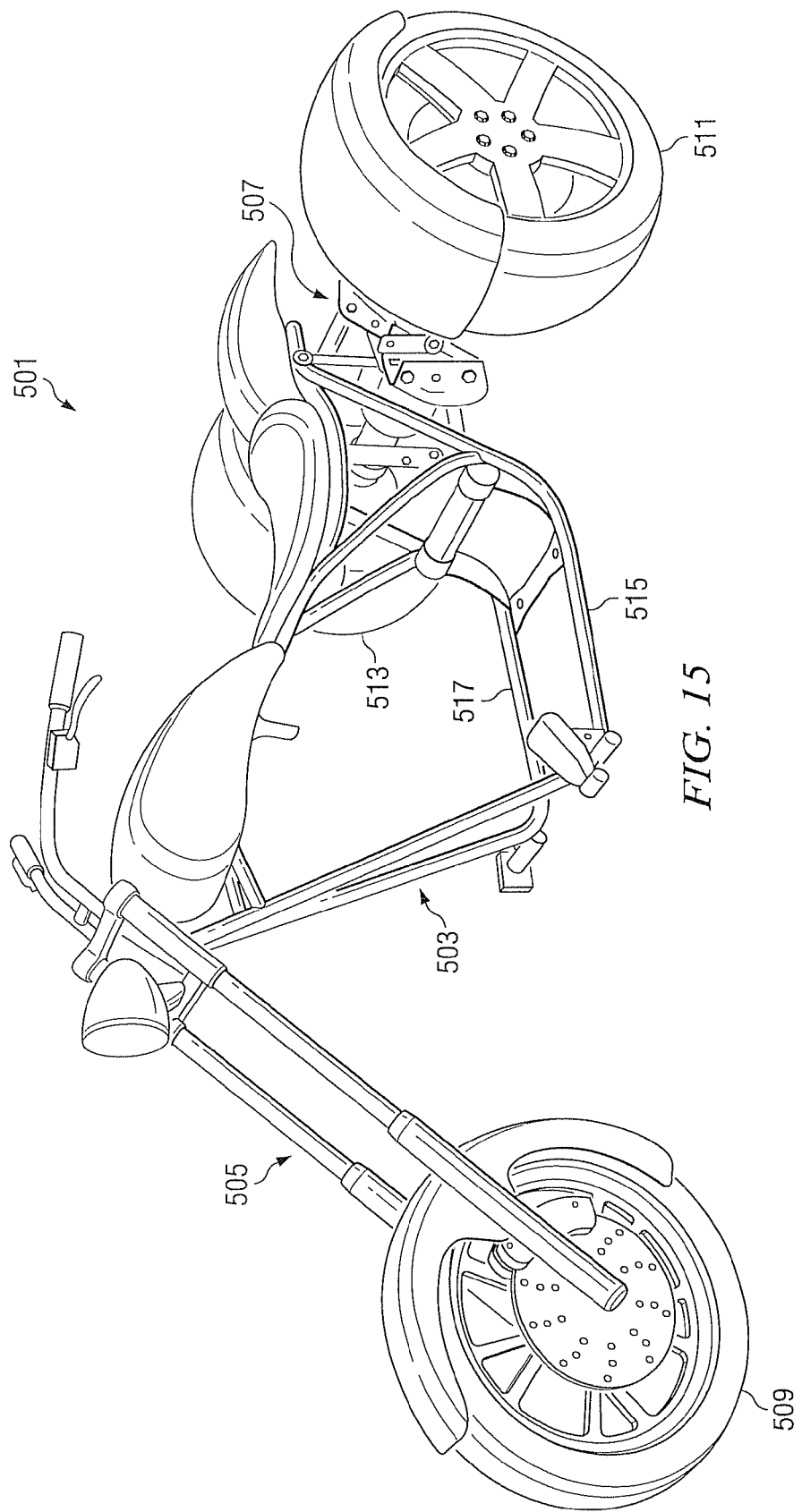
FIG. 15 is a perspective view of a rolling chassis for a motorcycle trike and according to the invention.

The suspension system of the present invention is particularly well suited for use in a universal rolling chassis according to the present invention. Such a universal rolling chassis allows a user to install engines from a wide variety of manufacturers with little or no modification to the rolling chassis or suspension system. FIG. 15 shows a rolling chassis 501 having a frame 503, front suspension 505, and rear tilting suspension 507. A front wheel 509 is attached to front suspension 505, and rear wheels 511, 513 are attached to rear suspension 507. Frame rails 515, 517 support an engine installed within frame 503.

It is apparent that an invention with significant advantages has been described and illustrated. Although the present invention is shown in a limited number of forms, it is not limited to just these forms, but is amenable to various changes and modifications without departing from the spirit thereof. For example, the invention is described as being used in motorcycles, but it should be understood that the tilting suspension system may also be used for other types of vehicles.

I claim:

1. A three-wheeled vehicle, comprising:
   a frame for supporting a first wheel;
   a subframe for supporting a second wheel and a third wheel, the subframe being coupled to the frame; and
   a tilting suspension system comprising:
      a rocker arm assembly pivotally coupled to the subframe;
      an actuator for actuating the rocker arm assembly, the actuator being pivotally coupled to the rocker arm assembly and the frame; and
      at least one shock absorber for constraining and damping movement of the tilting suspension system;
   wherein actuation of the actuator causes the frame and the subframe to simultaneously rotate about a generally longitudinal roll center.

2. The three-wheeled vehicle according to claim 1, wherein the subframe is pivotally coupled to the frame, such that the subframe pivots relative to the frame about a transverse axis.

3. The three-wheeled vehicle according to claim 1, wherein the subframe is rigidly coupled to the frame.

4. The three-wheeled vehicle according to claim 1, wherein the tilting suspension system further comprises:
   a control system for selectively controlling the actuator.

5. The three-wheeled vehicle according to claim 1, wherein the rocker arm assembly comprises:
   a pair of opposing rocker arms; and
   a link member pivotally disposed between the opposing rocker arms.

6. The three-wheeled vehicle according to claim 5, wherein the actuator is pivotally coupled to the link member.

7. The three-wheeled vehicle according to claim 1, wherein the subframe is disposed near the rear end of the vehicle.

8. The three-wheeled vehicle according to claim 1, wherein the subframe is disposed near the forward end of the vehicle.

* * * * *